US011832359B1

(12) United States Patent
Lu et al.

(10) Patent No.: US 11,832,359 B1
(45) Date of Patent: Nov. 28, 2023

(54) LIGHT-EMITTING DIODE LIGHTING DEVICE WITH LIGHT SPECTRUM ADJUSTMENT FUNCTION

(71) Applicant: Xiamen PVTECH Co., Ltd., Fujian (CN)

(72) Inventors: Fuxing Lu, Fujian (CN); Rongtu Liu, Fujian (CN); Chun Ming Liu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/978,192

(22) Filed: Oct. 31, 2022

(30) Foreign Application Priority Data

Jul. 13, 2022 (CN) .......................... 202221815244.1

(51) Int. Cl.
*H05B 45/20* (2020.01)
*F21S 4/28* (2016.01)
*H05B 45/345* (2020.01)
*F21Y 103/10* (2016.01)
*F21Y 115/10* (2016.01)
*F21Y 113/10* (2016.01)

(52) U.S. Cl.
CPC ................ *H05B 45/20* (2020.01); *F21S 4/28* (2016.01); *H05B 45/345* (2020.01); *F21Y 2103/10* (2016.08); *F21Y 2113/10* (2016.08); *F21Y 2115/10* (2016.08)

(58) Field of Classification Search
CPC ........ H05B 45/10; H05B 45/20; H05B 45/30; H05B 45/345; F21S 4/28; F21Y 2103/10; F21Y 2113/10; F21Y 2115/10
See application file for complete search history.

(56) References Cited

U.S. PATENT DOCUMENTS

2021/0120647 A1* 4/2021 Shearer ................. H05B 45/20

* cited by examiner

*Primary Examiner* — Jimmy T Vu
(74) *Attorney, Agent, or Firm* — Winston Hsu

(57) ABSTRACT

An LED lighting device with light spectrum adjustment function, which includes a light source group, a white light color temperature adjustment switch, a red/blue light ratio adjustment switch, a controller and a constant-current control circuit. The light source group includes a red LED, a blue LED, a first white LED and a second white LED. The white light color temperature adjustment switch generates a white light color temperature control signal. The red/blue light ratio adjustment switch generates a red/blue light ratio control signal. The controller receives the white light color temperature control signal and the red/blue light ratio control signal so as to generate an integrated control signal. The constant-current control circuit outputs a driving current according to the integrated control signal to control the above LEDs in order to generate a light having a target color temperature and a target light spectrum.

10 Claims, 3 Drawing Sheets

LIGHT-EMITTING DIODE LIGHTING DEVICE WITH LIGHT SPECTRUM ADJUSTMENT FUNCTION

BACKGROUND OF THE INVENTION

1. Field of the Invention

The present invention relates to a lighting device, in particular to an LED lighting device with light spectrum adjustment function.

2. Description of the Prior Art

The plant growth lights used in greenhouse farming generally include fluorescent lamps, high-pressure sodium lamps, incandescent lamps, etc., (the plants are usually covered by plastic films or other films made of similar materials), which can change the lighting conditions of the plants, thereby the growth of the plants can be promoted. The spectral energy distribution of currently available plant growth lights is designed according to the needs of human eyes. However, the spectrum needed for plant growth is different from that the human eyes. Therefore, the light generated by the currently available plant growth lights cannot effectively meet the needs of plant growth. In addition, a plant growth light is usually designed for one type of plant and cannot meet the growth requirements of different plants, so the currently available plant growth lights are inconvenient in use and the application thereof is also limited. Besides, the spectral energy distribution and light intensity of the currently available plant growth lights are uneven because the components of the spectrums thereof fail to be completely analyzed; the light intensities of some currently available plant growth lights are close to or even lower than the light compensation points of the plants. Therefore, the energy efficiency of the currently available plant growth lights cannot be effectively improved.

SUMMARY OF THE INVENTION

One embodiment of the present invention provides a light-emitting diode (LED) lighting device with light spectrum adjustment function, which includes a light source group, a white light color temperature adjustment switch, a red/blue light ratio adjustment switch, a controller and a constant-current control circuit. The light source group includes a red LED, a blue LED, a first white LED and a second white LED. The white light color temperature adjustment switch generates a white light color temperature control signal. The red/blue light ratio adjustment switch generates a red/blue light ratio control signal. The controller is connected to the white light color temperature adjustment switch and the red/blue light ratio adjustment switch, and receives the white light color temperature control signal and the red/blue light ratio control signal so as to generate an integrated control signal. The constant-current control circuit is connected to the controller, and outputs a driving current according to the integrated control signal to control the red LED, the blue LED, the first white LED and the second white LED in order to generate a light having a target color temperature and a target light spectrum.

In one embodiment, the combination of the first white LED and the second white LED generates at least two different color temperatures.

In one embodiment, the controller is connected to a wall switch for turning on or turning off the light source group and providing a stepless dimming function.

In one embodiment, the LED lighting device further includes a rectifier and filter circuit. The rectifier and filter circuit is connected to a power source, the controller and the constant-current control circuit in order to power the controller and the constant-current control circuit.

In one embodiment, the rectifier and filter circuit includes one or more of a rectifier circuit, a filter circuit and a surge protection circuit.

In one embodiment, the red LED, the blue LED, the first white LED and the second white LED are connected to each other in series.

In one embodiment, the red LED, the blue LED, the first white LED and the second white LED are connected to each other in parallel.

In one embodiment, the controller is a microcontroller unit, a central-processing unit, an application specific integrated circuit and a field programmable gate array.

In one embodiment, the white light color temperature adjustment switch and the red/blue light ratio adjustment switch are WIFI modules, near-field communication modules or microwave radar modules.

In one embodiment, the white light color temperature adjustment switch and the red/blue light ratio adjustment switch are buttons, knobs or dual in-line package switches.

The LED lighting device with light spectrum adjustment function in accordance with the embodiments of the present invention may have the following advantages:

(1) In one embodiment of the present invention, the LED lighting device has a white light color temperature adjustment switch and a red/blue light ratio adjustment switch in order to generate a white light color temperature control signal and a red/blue light ratio control signal. Further, the controller of the LED lighting device can receive the white light color temperature control signal and the red/blue light ratio control signal to generate an integrated control signal. Thus, the constant-current control circuit of the LED lighting device can output a driving current according to the integrated control signal to control the light source group of the LED lighting device with a view to generate a light having a target color temperature and a target light spectrum. Accordingly, the user only needs to adjust the spectrum and the color temperature of the light emitted by the LED lighting device, and then the LED lighting device can satisfy the growth requirements of different plants.

(2) In one embodiment of the present invention, the light source group of the LED lighting device includes a red LED, a blue LED and at least two full-spectrum white LEDs. Thus, the user can control the LED lighting device to generate the light capable of meeting the growth requirements of different plants by adjusting the red/blue light ratio and the color temperatures of the white LEDs. In this way, the energy efficiency of the LED lighting device can be significantly enhanced, so the LED lighting device can be more flexible in use and the application thereof can be more comprehensive.

(3) In one embodiment of the present invention, the LED lighting device can provide the stepless dimming function by a wall switch. Therefore, the user can properly adjust the illumination of the light source group when the environmental illumination changes due to weather conditions, such that the illumination of the LED lighting device can be always appropriate in order to conform to actual requirements. Thus, the practicality of the LED lighting device can be significantly increased.

(4) In one embodiment of the present invention, the LED lighting device can has a near-field communication (NFC) module, a WIFI module or a microwave radar module, so the user can transmit an adjustment signal to the white light color temperature adjustment switch via his/her electronic device. Thus, the LED lighting device can provide the intelligent control function.

(5) In one embodiment of the present invention, the circuit design of the LED lighting device is simple and can achieve high performance, so the LED lighting device can achieve the desired technical effect without significantly increasing the cost thereof. Thus, the LED lighting device can have high commercial value.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
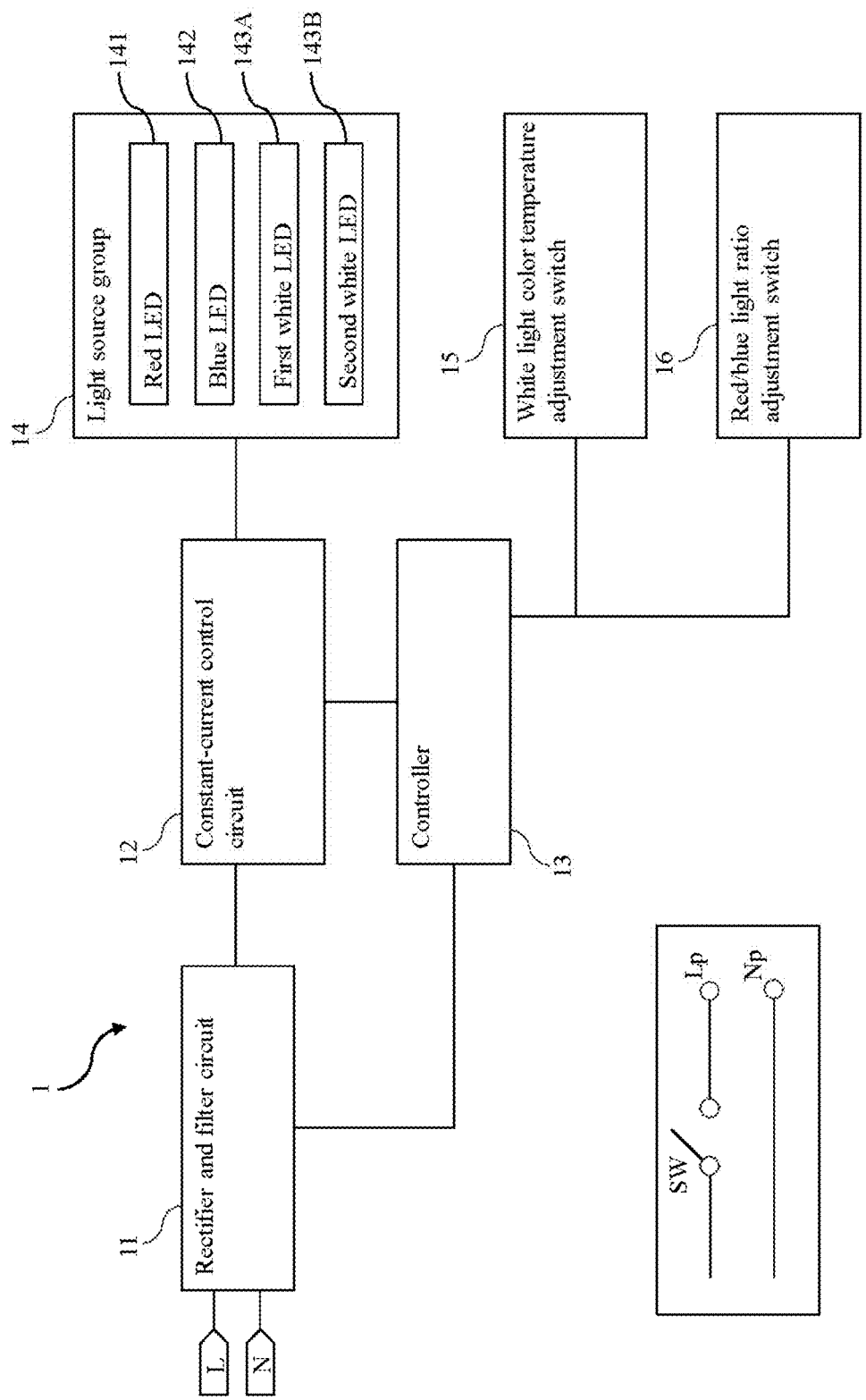
FIG. 1 is a block diagram of a circuit of a light-emitting diode (LED) lighting device with light spectrum adjustment function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of a circuit of a light-emitting diode (LED) lighting device with light spectrum adjustment function in accordance with one embodiment of the present invention. As shown in FIG. 1, the LED lighting device 1 includes a rectifier and filter circuit 11, a constant-current control circuit 12, a controller 13, a light source group 14, a white light color temperature adjustment switch 15 and a red/blue light ratio adjustment switch 16.

The rectifier and filter circuit 11 is connected to the live wire contact Lp and the neutral contact Np of a wall switch SW via a live wire terminal L and a neutral wire terminal N. The wall switch SW is connected to a power source (the power source may be an AC power source, such as utility power). In one embodiment, the rectifier and filter circuit 11 may include one or more of a rectifier circuit, a filter circuit and a surge protection circuit.

The constant-current control circuit 12 is connected to the rectifier and filter circuit 11. In one embodiment, the constant-current control circuit 12 is a LED constant-current controller or other components having constant-current control function.

The light source group 14 is connected to the constant-current control circuit 12. The light source group 14 includes a red LED 141, a blue LED 142, a first white LED 143A and a second white LED 143B. The combination of the first white LED 143A and the second white LED 143B can generate at least two different color temperatures; the above color temperatures may be 2700K~6500K. In another embodiment, the light source group 14 may include a plurality of red LEDs 141 and a plurality of blue LEDs 142. In still another embodiment, the light source group 14 may include 3 or more white LEDs. The red LED 141, the blue LED 142, the first white LED 143A and the second white LED 143B may be connected to each other in series or in parallel according to actual power requirements.

The controller 13 is connected to the rectifier and filter circuit 11 and the constant-current control circuit 12. In one embodiment, the controller 13 may be a microcontroller unit (MCU), a central-processing unit (CPU), an application specific integrated circuit (ASIC), a field programmable gate array (FPGA) or other similar components.

Figure 2:
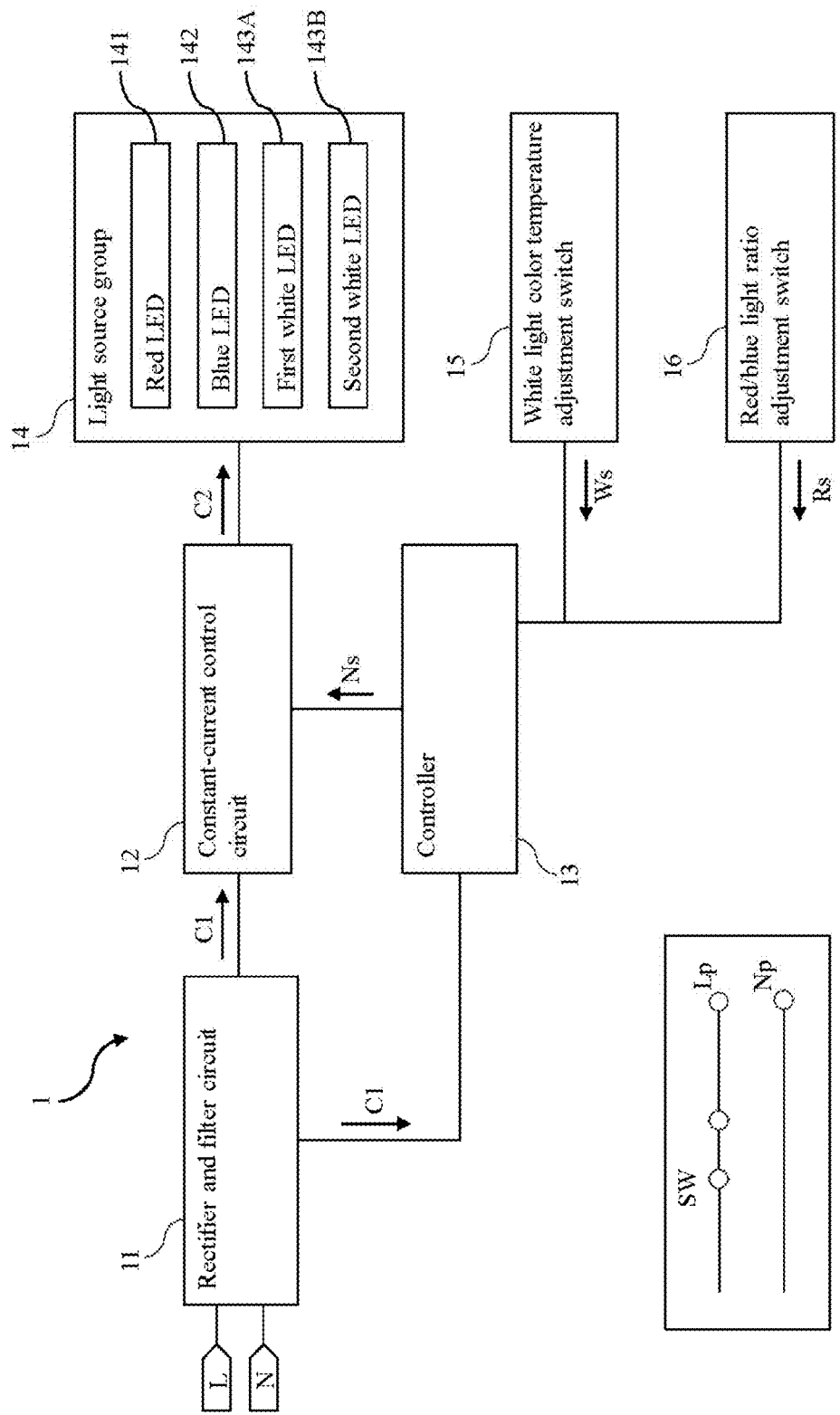
FIG. 2 is a schematic view illustrating an operational status of the LED lighting device with light spectrum adjustment function in accordance with one embodiment of the present invention.

Please refer to FIG. 2, which is a schematic view illustrating an operational status of the LED lighting device with light spectrum adjustment function in accordance with one embodiment of the present invention. As shown in FIG. 2, the white light color temperature adjustment switch 15 and the red/blue light ratio adjustment switch 16 are connected to the controller 13. The white light color temperature adjustment switch 15 can generate a white light color temperature control signal Ws and the red/blue light ratio adjustment switch 16 can generate a red/blue light ratio adjustment signal Rs.

When the wall switch SW is turned on, the power source outputs an alternating current to the rectifier and filter circuit 11. Then, the rectifier and filter circuit 11 generates a rectified current C1 and outputs the rectified current C1 to the constant-current control circuit 12 and the controller 13 in order to power the constant-current control circuit 12 and the controller 13. The controller 13 receives the white light color temperature control signal Ws and the red/blue light ratio control signal Rs to generate an integrated control signal Ns. Afterward, the controller 13 transmits the integrated control signal Ns to the constant-current control circuit 12. Next, the constant-current control circuit 12 outputs a driving current C2 according to the integrated control signal Ns so as to control the red LED 141, the blue LED 142, the first white LED 143A and the second white LED 143B to generate a light having a target color temperature and a target light spectrum.

Via the above mechanism, the user can determine the best color temperature and the most appropriate spectrum according to the growth requirements of a plant, and operate the white light color temperature adjustment switch 15 and the red/blue light ratio adjustment switch 16 to generate the integrated control signal Ns corresponding thereto. Next, the controller 13 can transmit the integrated control signal Ns to the constant-current control circuit 12. Afterward, the constant-current control circuit 12 outputs the driving current C2 according to the integrated control signal Ns to control the red LED 141, the blue LED 142, the first white LED 143A and the second white LED 143B in order to generate the light which can conform to the growth requirements of the plant. As a result, the user only needs to adjust the spectrum and the color temperature of the light emitted by the LED lighting device 1, and then the LED lighting device 1 can satisfy the growth requirements of different plants.

Besides, since the LED lighting device 1 includes the red LED 141, the blue LED 142, the first white LED 143A and the second white LED 143B, the LED lighting device 1 can precisely generate the light which can satisfy the growth requirements of different plants by adjusting the red/blue light ratio and the color temperatures of the white lights emitted by the white LEDs. Thus, the energy efficiency of the LED lighting device 1 can be greatly enhanced, so the LED lighting device 1 can be more flexible in use and more comprehensive in application.

The user can turn on or turn off the light source group 14 via the wall switch SW or perform the stepless dimming function by swiftly turning off and then turning on the wall switch SW. For instance, when the light source group 14 is in operation and the brightness thereof is 100% (or 30% or 60%) of the maximal brightness thereof, the intelligent controller 13 can increase the brightness of the light source group 14 by the dimming speed of 10% (of the maximal brightness thereof)/second. In this way, the light source group 14 can reach the maximal brightness thereof after 10 seconds. When the light source group 14 reaches the desired brightness, the user can swiftly turn off and then turn on the wall switch SW so as to remain the current brightness of the light source group 14. For example, when the light source group 14 is in operation and the brightness thereof is 100% of the maximal brightness thereof, the light source group 14 can reach 70% of the maximal brightness thereof after 7 seconds. In this case, the user can swiftly turn off and then turn on the wall switch SW to start the stepless dimming function, and then swiftly turning off and then turning on the wall switch SW again after 7 seconds, such that the brightness of the light source group 14 can remain 70% of the maximal brightness thereof.

As set forth above, the LED lighting device 1 can provide the stepless dimming function via the wall switch SW. Therefore, the user can properly adjust the illumination of the light source group 14 when the environmental illumination changes due to weather conditions, such that the illumination of the LED lighting device 1 can be always appropriate in order to conform to actual requirements. Thus, the practicality of the LED lighting device 1 can be significantly increased.

The embodiment just exemplifies the present invention and is not intended to limit the scope of the present invention; any equivalent modification and variation according to the spirit of the present invention is to be also included within the scope of the following claims and their equivalents.

It is worthy to point out that the spectral energy distribution of the currently available plant growth lights is not designed for plants, so cannot satisfy the growth requirements of plants. Besides, a plant growth light is usually designed for one type of plant and cannot meet the growth requirements of different plants. On the contrary, according to one embodiment of the present invention, the LED lighting device has a white light color temperature adjustment switch and a red/blue light ratio adjustment switch in order to generate a white light color temperature control signal and a red/blue light ratio control signal. Further, the controller of the LED lighting device can receive the white light color temperature control signal and the red/blue light ratio control signal to generate an integrated control signal. Thus, the constant-current control circuit of the LED lighting device can output a driving current according to the integrated control signal to control the light source group of the LED lighting device with a view to generate a light having a target color temperature and a target light spectrum. Accordingly, the user only needs to adjust the spectrum and the color temperature of the light emitted by the LED lighting device, and then the LED lighting device can satisfy the growth requirements of different plants.

Moreover, according to one embodiment of the present invention, the light source group of the LED lighting device includes a red LED, a blue LED and at least two full-spectrum white LEDs. Thus, the user can control the LED lighting device to generate the light capable of meeting the growth requirements of different plants by adjusting the red/blue light ratio and the color temperatures of the white LEDs. In this way, the energy efficiency of the LED lighting device can be significantly enhanced, so the LED lighting device can be more flexible in use and the application thereof can be more comprehensive.

Further, according to one embodiment of the present invention, the LED lighting device can provide the stepless dimming function by a wall switch. Therefore, the user can properly adjust the illumination of the light source group when the environmental illumination changes due to weather conditions, such that the illumination of the LED lighting device can be always appropriate in order to conform to actual requirements. Thus, the practicality of the LED lighting device can be significantly increased.

Furthermore, according to one embodiment of the present invention, the circuit design of the LED lighting device is simple and can achieve high performance, so the LED lighting device can achieve the desired technical effect without significantly increasing the cost thereof. Thus, the LED lighting device can have high commercial value. As described above, the LED lighting device according to the embodiments of the present invention can definitely achieve great technical effects.

Figure 3:
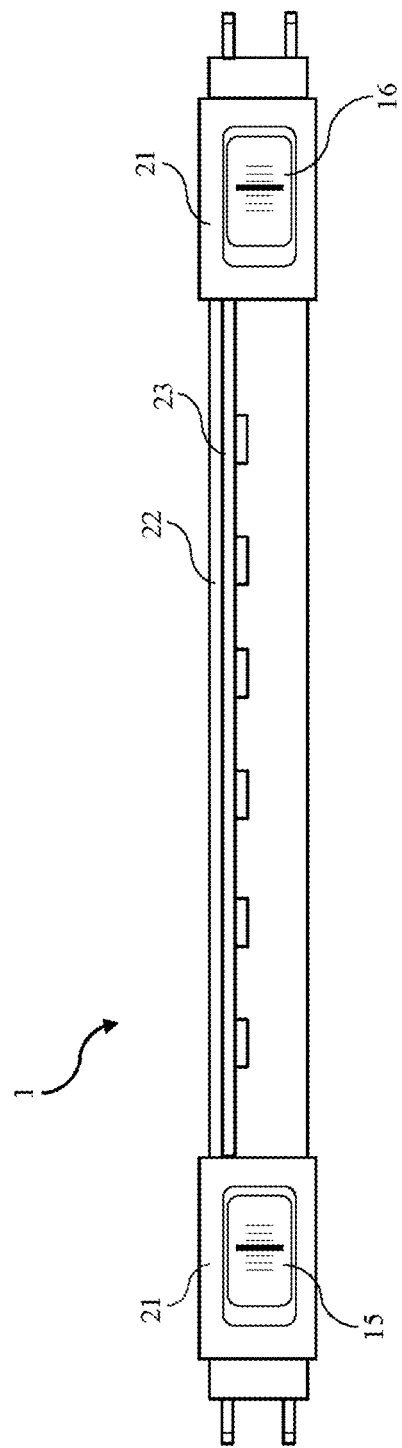
FIG. 3 is a schematic view illustrating a structure of the LED lighting device with light spectrum adjustment function in accordance with one embodiment of the present invention.

Please refer to FIG. 3, which is a schematic view illustrating a structure of the LED lighting device with light spectrum adjustment function in accordance with one embodiment of the present invention; please also refer to FIG. 1. As shown in FIG. 3 and FIG. 1, the LED lighting device 1 includes two lamp caps 21, a transparent housing 22 and a light source board 23. The rectifier and filter circuit 11, the constant-current control circuit 12 and the controller 13 may be disposed in one of the lamp caps 21. The light source group 14 may be disposed on the light source board 23. The white light color temperature adjustment switch 15 and the red/blue light ratio adjustment switch 16 may be disposed on the two lamp caps 21 respectively.

In this embodiment, the white light color temperature adjustment switch 15 and the red/blue light ratio adjustment switch 16 may be buttons, knobs, dual in-line package (DIP) switches or other similar components. In another embodiment, the white light color temperature adjustment switch 15 and the red/blue light ratio adjustment switch 16 may be WIFI modules, near-field communication (NFC) modules or microwave radar modules. The user can transmit the white light color temperature control signal Ws and the red/blue light ratio control signal Rs to the white light color temperature adjustment switch 15 and the red/blue light ratio adjustment switch 16 respectively via his/her electronic device and the corresponding communication protocol with a view to realize the intelligent control function.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the LED lighting device has a white light color temperature adjustment switch and a red/blue light ratio adjustment switch in order to generate a white light color temperature control signal and a red/blue light ratio control signal. Further, the controller of the LED lighting device can receive the white light color temperature control signal and the red/blue light ratio control signal to generate an integrated control signal. Thus, the constant-current control circuit of the LED lighting device can output a driving current according to the integrated control signal to control the light source group of the LED lighting device with a view to generate a light having a target color temperature and a target light spectrum. Accordingly, the user only needs to adjust the spectrum and the color temperature of the light emitted by the LED lighting device, and then the LED lighting device can satisfy the growth requirements of different plants.

According to one embodiment of the present invention, the light source group of the LED lighting device includes a red LED, a blue LED and at least two full-spectrum white LEDs. Thus, the user can control the LED lighting device to generate the light capable of meeting the growth requirements of different plants by adjusting the red/blue light ratio and the color temperatures of the white LEDs. In this way, the energy efficiency of the LED lighting device can be significantly enhanced, so the LED lighting device can be more flexible in use and the application thereof can be more comprehensive.

Further, according to one embodiment of the present invention, the LED lighting device can provide the stepless dimming function by a wall switch. Therefore, the user can properly adjust the illumination of the light source group when the environmental illumination changes due to weather conditions, such that the illumination of the LED lighting device can be always appropriate in order to conform to actual requirements. Thus, the practicality of the LED lighting device can be significantly increased.

Moreover, according to one embodiment of the present invention, the LED lighting device can has a near-field communication (NFC) module, a WIFI module or a microwave radar module, so the user can transmit an adjustment signal to the white light color temperature adjustment switch via his/her electronic device. Thus, the LED lighting device can provide the intelligent control function.

Furthermore, according to one embodiment of the present invention, the circuit design of the LED lighting device is simple and can achieve high performance, so the LED lighting device can achieve the desired technical effect without significantly increasing the cost thereof. Thus, the LED lighting device can have high commercial value.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting device with light spectrum adjustment function, comprising:
   a light source group comprising a red LED, a blue LED, a first white LED and a second white LED;
   a white light color temperature adjustment switch configured to generate a white light color temperature control signal;
   a red/blue light ratio adjustment switch configured to generate a red/blue light ratio control signal;
   a controller connected to the white light color temperature adjustment switch and the red/blue light ratio adjustment switch, and configured to receive the white light color temperature control signal and the red/blue light ratio control signal to generate an integrated control signal; and
   a constant-current control circuit connected to the controller, and configured to output a driving current according to the integrated control signal to control the red LED, the blue LED, the first white LED and the second white LED so as to generate a light having a target color temperature and a target light spectrum.

2. The LED lighting device with light spectrum adjustment function as claimed in claim 1, wherein a combination of the first white LED and the second white LED generates at least two different color temperatures.

3. The LED lighting device with light spectrum adjustment function as claimed in claim 1, wherein the controller is connected to a wall switch configured to turn on or turn off the light source group and provide a stepless dimming function.

4. The LED lighting device with light spectrum adjustment function as claimed in claim 1, further comprising a rectifier and filter circuit connected to a power source, the controller and the constant-current control circuit in order to power the controller and the constant-current control circuit.

5. The LED lighting device with light spectrum adjustment function as claimed in claim 1, wherein the rectifier and filter circuit comprises one or more of a rectifier circuit, a filter circuit and a surge protection circuit.

6. The LED lighting device with light spectrum adjustment function as claimed in claim 1, wherein the red LED, the blue LED, the first white LED and the second white LED are connected to each other in series.

7. The LED lighting device with light spectrum adjustment function as claimed in claim 1, wherein the red LED, the blue LED, the first white LED and the second white LED are connected to each other in parallel.

8. The LED lighting device with light spectrum adjustment function as claimed in claim 1, wherein the controller is a microcontroller unit, a central-processing unit, an application specific integrated circuit and a field programmable gate array.

9. The LED lighting device with light spectrum adjustment function as claimed in claim 1, wherein the white light color temperature adjustment switch and the red/blue light ratio adjustment switch are WIFI modules, near-field communication modules or microwave radar modules.

10. The LED lighting device with light spectrum adjustment function as claimed in claim 1, wherein the white light color temperature adjustment switch and the red/blue light ratio adjustment switch are buttons, knobs or dual in-line package switches.

* * * * *